(12) United States Patent
Xie (10) Patent No.: US 11,507,849 B2
(45) Date of Patent: Nov. 22, 2022

(54) WEIGHT-COEFFICIENT-BASED HYBRID INFORMATION RECOMMENDATION

(71) Applicant: Advanced New Technologies Co., Ltd., Grand Cayman (KY)

(72) Inventor: Dong Xie, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 1114 days.

(21) Appl. No.: 15/979,946

(22) Filed: May 15, 2018

(65) Prior Publication Data

US 2018/0260716 A1  Sep. 13, 2018

Related U.S. Application Data

(63) Continuation of application No. PCT/CN2016/106016, filed on Nov. 16, 2016.

(30) Foreign Application Priority Data

Nov. 25, 2015 (CN) .......................... 201510831206.3

(51) Int. Cl.
*G06N 5/02* (2006.01)
*G06F 16/9535* (2019.01)
*G06F 16/9536* (2019.01)

(52) U.S. Cl.
CPC ........... *G06N 5/02* (2013.01); *G06F 16/9535* (2019.01); *G06F 16/9536* (2019.01)

(58) Field of Classification Search
CPC .... G06N 5/02; G06F 16/9535; G06F 16/9536
See application file for complete search history.

(56) References Cited

U.S. PATENT DOCUMENTS

2008/0307316 A1  12/2008  Askey
2009/0144262 A1  6/2009  White et al.
(Continued)

FOREIGN PATENT DOCUMENTS

CN  101321137  12/2008
CN  102880691   1/2013
(Continued)

OTHER PUBLICATIONS

Salehi, Mojtaba, Isa Nakhai Kamalabadi, and Mohammad B. Ghaznavi Ghoushchi. "An effective recommendation framework for personal learning environments using a learner preference tree and a GA." IEEE Transactions on learning technologies 6.4 (2013): 350-363. (Year: 2013).*

(Continued)

*Primary Examiner* — Kevin W Figueroa
(74) *Attorney, Agent, or Firm* — Fish & Richardson P.C.

(57) ABSTRACT

Historical behavioral information of a user is retrieved, where the historical behavioral data includes data associated to operations performed by the user on a server. Recommended information sets are determined based on the historical behavioral information. A plurality of weight coefficients are generated for the plurality of recommended information sets. A recommendation list is determined based on the plurality of weight coefficients. It is determined whether the recommendation list satisfies a recommendation condition. If the recommendation list satisfies the recommendation condition, a recommendation based on the recommendation list is transmitted to the user device.

19 Claims, 3 Drawing Sheets

(56) References Cited

U.S. PATENT DOCUMENTS

| | | | |
|---|---|---|---|
| 2010/0169328 A1 | 7/2010 | Hangartner | |
| 2010/0185579 A1 | 7/2010 | Hong et al. | |
| 2011/0131077 A1 | 6/2011 | Tan | |
| 2012/0078825 A1 | 3/2012 | Kulkarni et al. | |
| 2015/0294011 A1 | 10/2015 | Tang et al. | |
| 2016/0132601 A1* | 5/2016 | Nice | G06F 16/9535 707/754 |
| 2016/0371373 A1 | 12/2016 | Dean et al. | |

FOREIGN PATENT DOCUMENTS

| | | |
|---|---|---|
| CN | 102902755 | 1/2013 |
| CN | 102957722 | 3/2013 |
| CN | 103106208 | 5/2013 |
| CN | 103778260 | 5/2014 |
| CN | 103971161 | 8/2014 |
| CN | 104123284 | 10/2014 |
| EP | 3382571 | 10/2018 |
| JP | 2012190061 | 10/2012 |
| JP | 2014203442 | 10/2014 |
| KR | 101539182 | 7/2015 |

OTHER PUBLICATIONS

McLaughlin, Matthew R., and Jonathan L. Herlocker. "A collaborative filtering algorithm and evaluation metric that accurately model the user experience." Proceedings of the 27th annual international ACM SIGIR conference on Research and development in information retrieval. 2004. (Year: 2004).*

International Search Report Issued by the International Searching Authority in International Application No. PCT/CN2016/106016 dated Feb. 13, 2017; 9 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Shi et al., "A Modified Particle Swarm Optimizer," IEEE International Conference on Evolutionary Computation Proceedings, Jun. 1998, pp. 69-73.

Christou et al., "AMORE: design and implementation of a commercial-strength parallel hybrid movie recommendation engine," Knowledge and Information Systems, 2016, 47(3):671-696.

European Extended Search Report in European Patent Application No. 16867911.6, dated Apr. 30, 2019, 12 pages.

Salehi et al., "An effective recommendation framework for personal learning environments using a learner preference tree and a GA," IEEE Transactions on learning technologies, 2013, 6(4):350-363.

PCT International Preliminary Report on Patentability in International Application No. PCT/CN2016/106016, dated May 29, 2018, 8 pages (with English translation).

McLaughlin et al., "A Collaborative Filtering Algorithm and Evaluation Metric that Accurately Model the User Experience," Proceedings of the 27th annual international ACM SIGIR conference on Research and development in information retrieval, Jul. 2004, pp. 329-336.

* cited by examiner

WEIGHT-COEFFICIENT-BASED HYBRID INFORMATION RECOMMENDATION

This application is a continuation of PCT Application No. PCT/CN2016/106016, filed on Nov. 16, 2016, which claims priority to Chinese Patent Application No. 201510831206.3, filed on Nov. 25, 2015, and each application is hereby incorporated by reference in its entirety.

TECHNICAL FIELD

The present application relates to the field of information technologies, and in particular, to a hybrid recommendation method and apparatus.

BACKGROUND

With the development of the information society, people are accustomed to using the Internet for social activities such as online shopping, online banking, and instant messaging. To improve user experience of website browsing and allow users to quickly find content they want to browse, online-service providers usually provide recommended information on websites based on user behavioral data. For example, a music website can recommend songs to users, and social networking websites can recommend friends to users.

A recommendation list for recommending information is usually calculated based on recommendation algorithms. There are generally two types of recommendation algorithms: recommendations based on information content and recommendations based on user behavior. The former can directly calculate a recommendation list without user behavioral data. However, a recommendation result in the recommendation list cannot be customized to user preference, and has low accuracy. The latter can calculate a relatively accurate recommendation list but is limited because the accuracy depends on the amount of user behavioral data. Traditionally, to address the disadvantages of those two types of recommendation algorithms, results of a plurality of recommendation algorithms are usually combined to calculate a hybrid recommendation list. A weight-coefficient-based hybrid recommendation method is most commonly used because of advantages such as ease of combination, convenience of combining recommended algorithms, and high flexibility.

However, whether a recommendation list obtained by using the weight-coefficient-based hybrid recommendation method satisfies user preference, that is, whether a recommendation result in the recommendation list satisfies the user's need depends on the weight coefficients used in weighted hybrid recommendation. Traditionally, weight coefficients used in the weight-coefficient-based hybrid recommendation are usually set and adjusted based on observation or heuristic experience.

Setting and adjusting weight coefficients based on observation or heuristic experience requires a lot of time and labor. Moreover, accuracy of the resultant recommendation list is relatively low. In addition, the user preference can change, but the weight coefficients that are set based on heuristic experience may be unchanged for a relatively long time. When the user preference changes, the existing method may not be able to provide timely adjustment accordingly. Therefore, the recommendation list obtained using the weight-coefficient-based hybrid recommendation method may be difficult to satisfy the user's need. Correspondingly, the user may need to spend a lot of time searching to find information, which consumes network resources and increases server pressure.

SUMMARY

Implementations of the present application provide an information recommendation method and apparatus, so as to resolve an existing problem of high network resource consumption and server pressure, because a user needs to spend a lot of time searching for useful information when a recommendation list obtained based on manually set weight coefficients does not satisfy the user's need.

An implementation of the present application provides an information recommendation method, including: determining historical behavioral information of a user; determining a plurality of recommended information sets based on the historical behavioral information; determining a recommendation list based on a weight coefficient predetermined for each recommended information set; determining whether the recommendation list satisfies a predetermined recommendation condition; and if the recommendation list satisfies the condition, recommending information included in the recommendation list to the user; or if the recommendation list does not satisfy the condition, adjusting the weight coefficient of each recommended information set, determining a new recommendation list based on the adjusted weight coefficient until the determined recommendation list satisfies the recommendation condition, and recommending information included in the recommendation list to the user.

An implementation of the present application provides an information recommendation apparatus, including: a behavior determining module, configured to determine historical behavioral information of a user; an information set determining module, configured to determine a plurality of recommended information sets based on the historical behavioral information; a combination module, configured to determine a recommendation list based on a weight coefficient predetermined for each recommended information set; and a determining and recommendation module, configured to determine whether the recommendation list satisfies a predetermined recommendation condition; and if the recommendation list satisfies the condition, recommend information included in the recommendation list to the user; or if the recommendation list does not satisfy the condition, adjust the weight coefficient of each recommended information set, instruct the combination module to determine a new recommendation list based on the adjusted weight coefficient until the recommendation list determined by the combination module satisfies the recommendation condition, and recommend information included in the recommendation list to the user.

The implementations of the present application provide the information recommendation method and apparatus. In the method, the recommended information sets are determined through different recommendation algorithms based on the historical behavioral information of the user. The recommendation list is determined based on the weight coefficient corresponding to each recommended information set. When the recommendation list does not satisfy the predetermined recommendation condition, the weight coefficient of each recommended information set corresponding to the recommendation list is adjusted, and an adjusted recommendation list is obtained until the obtained recommendation list satisfies the predetermined recommendation condition. Then the information in the recommendation list is recommended to the user. In the information recommendation method, the weight coefficient of each recommended information set does not need to be manually set, and can be automatically adjusted based on historical behavioral data of the user to obtain a recommendation list that satisfies the user's needs. Therefore, accuracy of the recommendation list can be improved, so that the user does not need to spend a lot of time searching for relevant information. In addition, network resources can be saved and server pressure can be relieved.

BRIEF DESCRIPTION OF DRAWINGS

The accompanying drawings described here are intended to provide a further understanding of the present application, and constitute a part of the present application The illustrative implementations of the present application and descriptions of the implementations are intended to describe the present application, and do not constitute limitations on the present application. In the accompanying drawings.

DESCRIPTION OF EMBODIMENTS

In implementations of the present application, a weight-coefficient-based hybrid recommendation method is still used to obtain a recommendation list. A weight coefficient of each recommended information set in the weight-coefficient-based hybrid recommendation method can be iteratively determined through an optimization algorithm based on historical behavioral information of a user, and does not need to be determined based on heuristic experience. As such, the obtained recommendation list is relatively accurate, and the user does not need to spend additional time searching for relevant information, which in turn, saves network resources and relieves server pressure.

To illustrate the objectives, technical solutions, and advantages of the present application, the following clearly and completely describes the technical solutions of the present application with reference to the implementations of the present application and corresponding accompanying drawings. Apparently, the described implementations are merely some but not all of the implementations of the present application. All other implementations obtained by a person of ordinary skill in the art based on the implementations of the present application without creative efforts shall fall within the protection scope of the present application.

Figure 1:
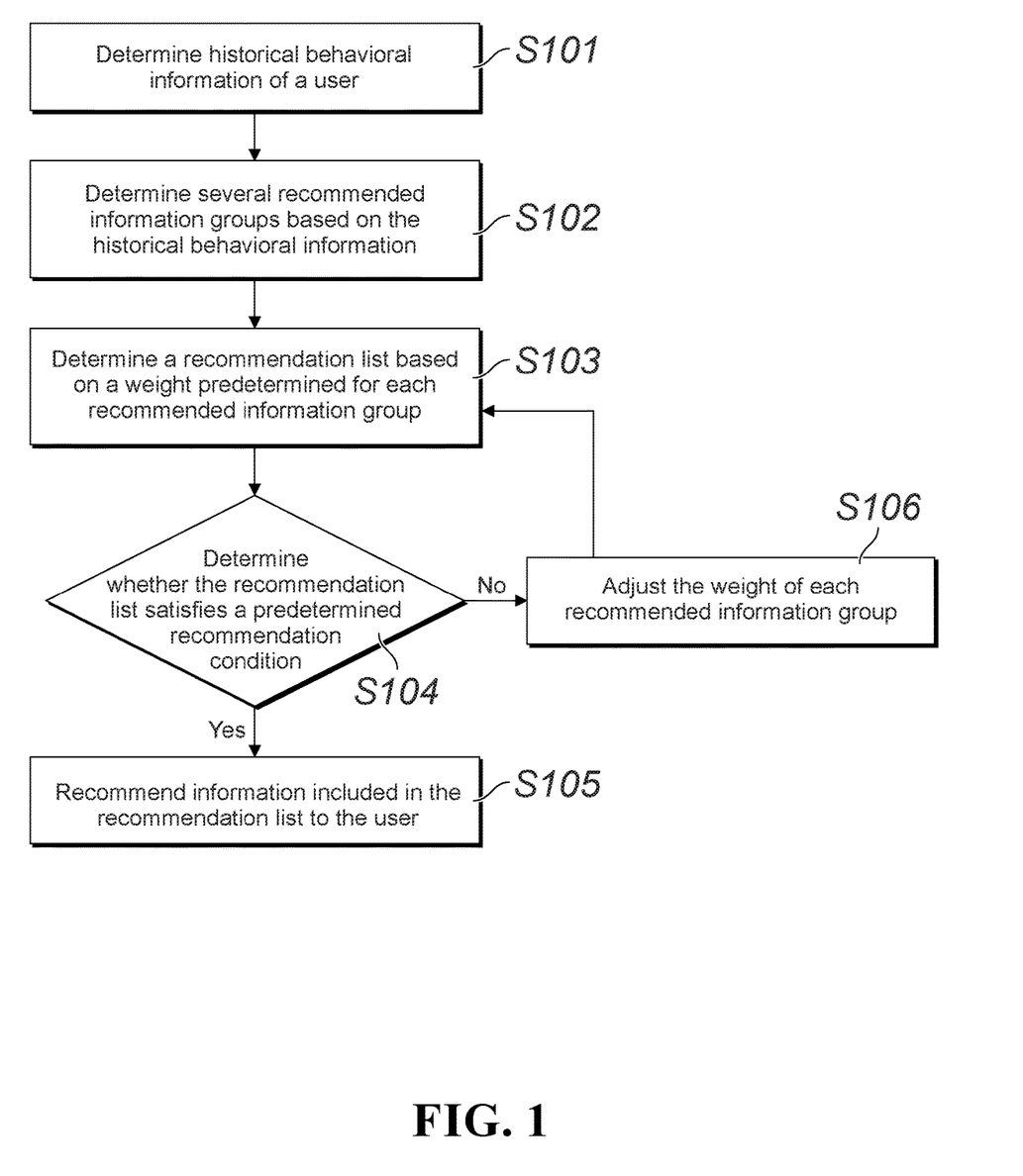
FIG. 1 illustrates an information recommendation process, according to an implementation of the present application.

FIG. 1 illustrates an information recommendation process, according to an implementation of the present application. The process includes the following steps:

S101: Determine historical behavioral information of a user.

In this implementation of the present application, a server needs to recommend more accurate information to the user that better conforms to the user's behavior habit, in order to save network resources and relieve server pressure. Therefore, the server needs to determine at least related information such as the user's preferences or needs, and selectively recommend information to the user based on the related information. Because such related information can be associated with user's behavior, a website can select recommended information based on the historical behavioral information of the user.

In step S101 of the implementation of the present application, the server first determines historical behavioral information of the user. The historical behavioral information of the user can be information corresponding to historical behavior of the user on the server, for example, content and attributes of information that the user browsed, content and attributes of information that the user searched, and content and attributes of information that the user followed or collected. It can be seen that such information is related to the user's preference, needs, etc. The server can determine historical data of the user in a predetermined time period. The time period can be determined based on needs. For example, the historical time period can be set as the past three months.

S102: Determine a plurality of recommended information sets based on the historical behavioral information.

In this implementation of the present application, the server uses a weight-coefficient-based hybrid recommendation method to determine a final recommendation list to be recommended to the user. Therefore, after determining the historical behavioral information of the user in step S101, the server can use different recommendation algorithms to determine the plurality of recommended information sets based on the historical behavioral information, so that hybrid weighting is subsequently performed on the recommended information sets to obtain the recommendation list. The recommendation algorithms can be a collaborative filtering-based recommendation algorithm, a content-based recommendation algorithm, an association rule-based recommendation algorithm, a knowledge-based recommendation algorithm, etc. The recommendation algorithms used to determine the recommended information sets are not limited for any particular implementations.

It is worthwhile to note that, a relative recommended weight coefficient can be obtained for each piece of information in the recommended information sets obtained through different recommendation algorithms. That is, for each recommended information set, each piece of information included in the recommended information set has a recommended weight coefficient corresponding to the recommended information set. Information included in a recommended information set can have the same recommended weight coefficient or different recommended weight coefficients corresponding to the recommended information set.

For example, after obtaining historical behavioral information of a user I, if the server uses a user-based collaborative filtering recommendation algorithm and a merchandise-based collaborative filtering recommendation algorithm to separately perform calculation based on the historical behavioral information, the server can determine two recommended information sets: a recommendation set $\alpha$ and a recommendation set $\beta$. Because the two recommended information sets are obtained through different recommendation algorithms, information included in the two recommended information sets may not be the same.

S103: Determine a recommendation list based on a weight coefficient predetermined for each recommended information set.

Because each recommended information set is determined in step S102, in the present application, the recommendation list can be determined based on the weight coefficient predetermined for each recommended information set. The predetermined weight coefficient can be an initial weight coefficient predetermined based on experience or a random initial weight coefficient obtained based on a random function. The predetermined weight coefficient represents an initial coefficient and may not be the weight coefficient used to obtain the final recommendation list.

In this implementation of the present application, determining a recommendation list based on a weight coefficient predetermined for each recommended information set can be described below.

First, for each recommended information set, a sub-weight coefficient of each piece of information included in the recommended information set can be determined based on a weight coefficient of the recommended information set and a recommended weight coefficient of each piece of information relative to the recommended information set. Here, each piece of information included in the recommended information set has a recommended weight coefficient corresponding to the recommended information set. Therefore, the sub-weight coefficient of each piece of information relative to the recommended information set in the present application can be a product of the recommended weight coefficient of each piece of information relative to the recommended information set and the weight coefficient of the recommended information set.

In addition, for each piece of information, a sum of sub-weight coefficients of the pieces of information relative to all recommended information sets can be determined, and the sum is used as a total weight coefficient of the particular piece of information. Finally, the recommendation list can be determined based on the total weight coefficient of each piece of information.

Further, determining the recommendation list based on the total weight coefficient of each piece of information can include determining the recommendation list based on a descending order of total weight coefficients of all pieces of information. The pieces of information having larger total weight coefficients can be preferably recommended to the user. Because the recommendation list is determined based on the total weight coefficient of each piece of information, the recommendation list can include information from each recommended information set. When the recommendation list includes a large amount of information, if all the information in the recommendation list is recommended to the user, it may be difficult for the user to find needed information from the recommended information, and the user still needs to search for information. Accordingly, in the method provided in the present application, the recommendation list can be formed by first few pieces of information among all the information. That is, the pieces of information included in each recommended information set can be ordered in descending order based on their total weight coefficients. Then a specific number of pieces of information can be selected according to the order to form the recommendation list.

Continuing with the earlier described example, assume that weight coefficients predetermined for the two recommended information sets are (0.4, 0.6). The weight coefficients for the recommended information set α and the recommended information set β are 0.4 and 0.6, respectively. Table 1 lists information included in the recommended information set α, recommended information set β, and recommended weight coefficients of each piece of information included in the two recommended information sets.

TABLE 1

| Information included in the recommended information set α | Recommended weight coefficient of information in the recommended information set α | Information included in the recommended information set β | Recommended weight coefficient of information in the recommended information set β |
| --- | --- | --- | --- |
| Merchandise A | 0.9 | Merchandise M | 0.8 |
| Merchandise O | 0.8 | Merchandise A | 0.6 |
| Merchandise C | 0.6 | Merchandise O | 0.5 |
| Merchandise G | 0.4 | Merchandise G | 0.3 |
| Merchandise F | 0.3 | Merchandise T | 0.2 |

In Table 1, a recommended weight coefficient of merchandise A in the recommended information set α is 0.9, and a recommended weight coefficient of merchandise A in the recommended information set β is 0.6; a weight coefficient of the recommended information set α is 0.4, and a weight coefficient of the recommended information set β is 0.6. Accordingly, a sub-weight coefficient of the piece of information corresponding to the recommended information set α is 0.36, and a sub-weight coefficient of the piece of information corresponding to the recommended information set β is 0.36. In this case, a total weight coefficient of the piece of information is 0.72, that is, a total weight coefficient of merchandise A is 0.72.

Table 2 lists total weight coefficients determined for the merchandise.

TABLE 2

| Information | Total weight coefficient |
| --- | --- |
| Merchandise A | 0.72 |
| Merchandise O | 0.62 |
| Merchandise M | 0.48 |
| Merchandise G | 0.34 |
| Merchandise C | 0.24 |
| Merchandise T | 0.12 |
| Merchandise F | 0.12 |

In Table 2, the merchandise is ordered in descending order based on the total weight coefficients: merchandise A, merchandise O, merchandise M, merchandise G, merchandise C, merchandise T, and merchandise F. If the first five pieces of information are selected to form the recommendation list, the final recommendation list includes merchandise A, merchandise O, merchandise M, merchandise G, and merchandise C.

S104: Determine whether the recommendation list satisfies a predetermined recommendation condition; and if the recommendation list satisfies the condition, proceed to step S105, or if the recommendation list does not satisfy the condition, proceed to step S106.

In this implementation of the present application, the recommendation list is determined in steps S101 to S103. However, it cannot be determined whether the information in the recommendation list meets the user's expectation. Therefore, whether the recommendation list satisfies the predetermined recommendation condition needs to be further determined in the present application. Different subsequent processing methods can be selected based on different determination results.

In addition, whether the information included in the recommended information list meets the user's expectation needs to be determined based on the historical behavioral information of the user. Therefore, in the present application, accuracy of the recommendation list can be determined based on the historical behavioral information of the user determined in step S101. Further, whether the accuracy of the recommendation list is greater than a predetermined threshold can be determined. If the accuracy is greater than the threshold, the recommendation list satisfies the predetermined recommendation condition, and step S105 is performed. If the accuracy is not greater than the threshold, the recommendation list does not satisfy the predetermined recommendation condition, and step S106 is performed.

The number of pieces of information included in the recommendation list and consistent with the historical behavioral information of the user can be determined first. Then a ratio of the number to the total number of pieces of information included in the recommendation list is determined. The ratio is used as the accuracy of the recommendation list.

Continuing with the earlier described example, assume that a predetermined threshold on the server is 0.4. The historical behavioral information of the user is: the user clicks merchandise A, merchandise Q, merchandise R, merchandise H, merchandise M, merchandise F, and merchandise L. The information in the recommendation list determined in step S103 includes: merchandise A, merchandise O, merchandise M, merchandise G, and merchandise C. Therefore, the information included in the recommendation list and consistent with the historical behavioral information of the user is merchandise A and merchandise M, and the number of pieces of consistent information is 2. Because the recommendation list includes a total of five pieces of information, the ratio of the number of pieces of consistent information to the total number of pieces of information included in the recommendation list is 0.4. Finally, the ratio (0.4) is used as the accuracy of the recommendation list. The accuracy is not greater than the predetermined threshold. Therefore, the recommendation list does not satisfy the predetermined recommendation condition, and step S106 is performed.

S105: Recommend information included in the recommendation list to the user.

In this implementation of the present application, if it is determined in step S104 that the recommendation list satisfies the predetermined condition, the recommendation list can satisfy the user's needs. Therefore, step S105 can be performed to recommend the information included in the recommendation list to the user.

S106: Adjust the weight coefficient of each recommended information set, and return to step S103.

When it is determined in step S104 that the recommendation list does not satisfy the recommendation condition, the server can use a predetermined optimization algorithm to adjust the weight coefficient of each recommended information set and determine a new recommendation list based on the adjusted weight coefficient until the determined recommendation list satisfies the recommendation condition. Then the server recommends information included in the recommendation list to the user.

In the present application, the weight coefficient of each recommended information set can be automatically adjusted through an iterative process of steps S103 to S106 to more quickly determine accurate recommended information, save network resources, and relieve server pressure.

The predetermined optimization algorithm can be used to determine a value of an adjustment to the weight coefficient of each recommended information set based on at least one of the following iteration information: a value of the last adjustment to the weight coefficient of each recommended information set, accuracy of a recommendation list that is determined last time, or a largest accuracy value among accuracy values of all obtained recommendation lists. Then the weight coefficient of each recommended information set is adjusted based on the determined value of the adjustment.

In the following example of the weight coefficient adjustment process, the used optimization algorithm is the particle swarm algorithm. The server can use the equation $V_{k+1}=W_k \times V_k + C_1 \times rand_1 \times (Pbest-X_k) + C_2 \times rand_2 \times (Gbest-X_k)$ to determine the value of the adjustment to the weight coefficient of each recommended information set, and then use the equation $X_{k+1}=X_K+V_{K+1}$ to determine an adjusted weight coefficient of each recommended information set.

$V_{k+1}$ is a value of the $(K+1)^{th}$ adjustment to the weight coefficient of each recommended information set. $V_k$ is a value of the $K^{th}$ adjustment to the weight coefficient. $W_k$ is an inertia weight coefficient of the $K^{th}$ adjustment. $C_1$ and $C_2$ are predetermined constants. $rand_1$ and $rand_2$ are random functions whose value ranges are (0, 1). Pbest is a weight coefficient of each recommended information set corresponding to the more accurate one in a recommendation list determined after the $K^{th}$ adjustment and a recommendation list determined after the $(K+1)^{th}$ adjustment. Gbest is a weight coefficient of each recommended information set corresponding to the most accurate one in all determined recommendation lists. $X_k$ is a weight coefficient of each recommended information set corresponding to the recommendation list determined after the $K^{th}$ adjustment.

It is worthwhile to note that the inertia weight coefficient $W_k$ decreases with an increase in the number K of adjustments. $W_k$ can be determined through the equation $W_k=W_s-(W_s-W_e) \times (K/K_{max})^2$. In the equation, $W_s$, is a predetermined initial inertia weight coefficient and can be set based on experience. $W_e$ is a predetermined final inertia weight coefficient and can also be set based on experience. K is the current number of adjustments. $K_{max}$ is the predetermined maximum number of adjustments.

As can be seen from the earlier described equation, if the present adjustment is the $(K+1)^{th}$ adjustment, Pbest in the equation can be determined by comparing the accuracy of the recommendation list determined last time in the iteration information with accuracy of the recommendation list obtained after the present adjustment. Gbest can be determined by comparing the largest accuracy value with the accuracy of the recommendation list obtained after the present adjustment. $V_k$ can be determined based on the value of the last adjustment to the weight coefficient of each recommended information set in the iteration information. Then the value $V_{k+1}$ of the present adjustment can be determined through calculation. The weight coefficient of each recommended information set after the present adjustment can be determined based on the equation $X_{k+1}=X_K+V_{K+1}$.

In addition, it is worthwhile to note that the optimization algorithm used in the present application can be the particle swarm algorithm, the genetic algorithm, the ant colony algorithm, the annealing algorithm, etc. In the present application, only the particle swarm algorithm is used as an example for description. The optimization algorithm used to determine the value of the adjustment to the weight coefficient of each recommended information set is not limited.

After the adjusted weight coefficient of each recommended information set is determined, a new recommendation list can be determined based on the method described in step S103. It can then be determined whether the new recommendation list satisfies the recommendation condition based on the method described in step S104. If the recommendation list satisfies the recommendation condition, step S105 is performed to recommend information in the recommendation list to the user. If the recommendation list does not satisfy the recommendation condition, step S106 can be repeated until the determined recommendation list satisfies the recommendation condition, and step S105 is then performed.

In addition, in step S104, the accuracy of the recommendation list is determined based on the historical behavioral information of the user. It can be seen from steps S101 to S103 that the recommendation list is also determined based on the historical behavioral information of the user. Therefore, in step S104, the server determines whether a recommendation list determined based on the information set is consistent with the information set. It affects the accuracy of the determined recommendation list, and leads to low accuracy reliability.

In view of this, in the present application, the historical behavioral information of the user can be further divided into test information and reference information before the plurality of recommended information sets are determined in step S102, so that the accuracy of the determined recommendation list is more reliable.

The test information is used to determine the recommendation list based on step S102 and step S103 in the present application. In step S102, the plurality of recommended information sets can be determined through different recommendation algorithms based on the test information. Then the recommendation list is determined in step S103.

In step S104, the reference information is compared with the recommendation list to determine the accuracy of the recommendation list. That is, the accuracy of the recommendation list can be determined based on the reference information in step S104.

The reference information is also historical behavioral information of the user but is different from the historical behavioral information of the user used to determine the recommendation list. Therefore, the comparison based on the reference information can more accurately determine the accuracy of the recommendation list, and the determined accuracy is more reliable.

When the accuracy of the recommendation list is determined based on the reference information, the equation $P_u = R_u \cap T_u / R_u$ can be used to calculate the accuracy. P indicates the accuracy. R indicates a set of the information included in the recommendation list. T indicates a set of information included in the reference information. u indicates accuracy for a user u. It can be seen that the recommendation list determined based on the reference information can more accurately reflect the amount of information that satisfies the user's needs in the recommendation list.

For example, assume that the server divides the historical behavioral information of the user I into test information and reference information in step S102, and the recommendation list is determined based on the test information in step S103. The predetermined threshold in the present application is 0.4. The accuracy of the information: merchandise A, merchandise O, merchandise M, merchandise G, and merchandise C included in the recommendation list is determined based on the reference information (for example, merchandise A, merchandise Q, merchandise R, merchandise H, and merchandise M). It can be seen based on the equation $P_u = R_u \cap T_u / R_u$ that $P_I = 0.4$. In this case, the accuracy is not greater than the predetermined threshold, and the recommendation list does not satisfy the recommendation condition. Therefore, step S106 needs to be repeated.

Further, when the weight coefficient of each recommended information set is adjusted through the iteration process of steps S103 to S106, the accuracy of the determined recommendation list is still not greater than the predetermined threshold after a plurality of adjustments. In this case, the server still cannot accurately recommend information to the user after consuming a lot of resources.

To avoid the problem that the determined recommendation list still cannot satisfy the recommendation condition after many adjustments, whether the number of adjustments reaches a predetermined number of times needs to be further determined in the present application. When the number of adjustments to the recommendation list reaches the predetermined number of times, information in a recommendation list determined based on Gbest is recommended to the user. The predetermined number of times can be the maximum number $K_{max}$ of adjustments.

The recommendation list corresponding to Gbest is the most accurate one in all determined recommendation lists, and can satisfy the user's needs to some extent. It avoids the problem that the server still cannot accurately recommend information to the user after consuming a lot of resources.

In addition, the recommendation method illustrated in FIG. 1 provided in the present application can be triggered by some specific operations performed the user. For example, when the user logs in to an account, the method illustrated in FIG. 1 can be triggered to recommend information to the user. Certainly, the method can also be triggered at a predetermined time interval. Details are not repeated here for simplicity.

It is worthwhile to note that a plurality of servers can be used to perform the recommendation method described in the present application. For example, a plurality of servers in a content delivery network can be used to share pressure of performing the recommendation method.

Figure 2:
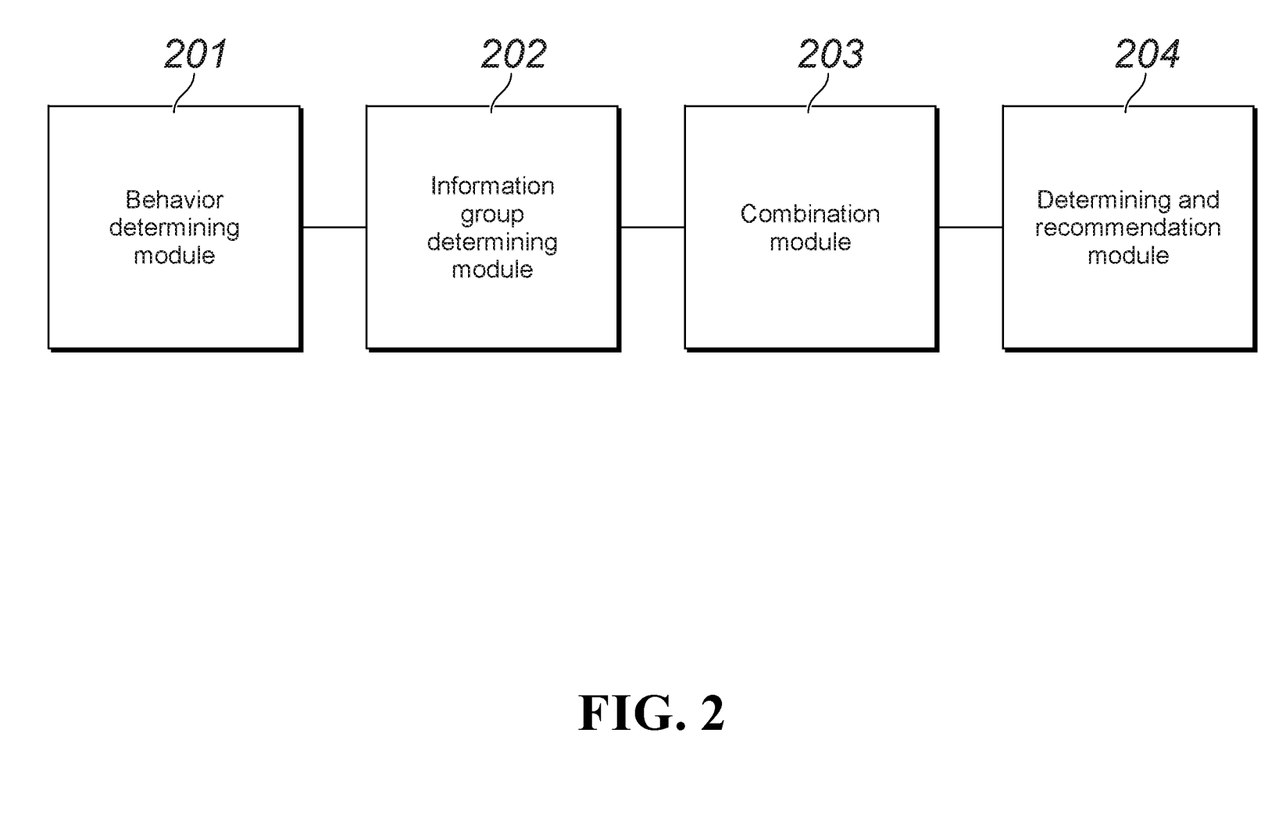
FIG. 2 is a schematic structural diagram illustrating an information recommendation apparatus, according to an implementation of the present application.

Based on the information recommendation process illustrated in FIG. 1, as shown in FIG. 2, an implementation of the present application further provides an information recommendation apparatus.

FIG. 2 is a schematic structural diagram illustrating an information recommendation apparatus, according to an implementation of the present application. The apparatus includes: a behavior determining module 201, configured to determine historical behavioral information of a user; an information set determining module 202, configured to determine a plurality of recommended information sets based on the historical behavioral information; a combination module 203, configured to determine a recommendation list based on a weight coefficient predetermined for each recommended information set; and a determining and recommendation module 204, configured to: determine whether the recommendation list satisfies a predetermined recommendation condition; and if the recommendation list satisfies the condition, recommend information included in the recommendation list to the user; or if the recommendation list does not satisfy the condition, adjust the weight coefficient of each recommended information set, instruct the combination module 203 to determine a new recommendation list based on the adjusted weight coefficient until the recommendation list determined by the combination module 203 satisfies the recommendation condition, and recommend information included in the recommendation list to the user.

The information set determining module 202 is further configured to divide the historical behavioral information of the user into test information and reference information before determining the plurality of recommended information sets based on the historical behavioral information. The information set determining module 202 is then configured to determine the plurality of recommended information sets through different recommendation algorithms based on the test information.

The combination module 203 is configured to: for each recommended information set, determine a sub-weight coefficient of each piece of information included in the recommended information set based on a weight coefficient of the recommended information set and a recommended weight coefficient of each piece of information relative to the recommended information set; for each piece of information, determine a sum of sub-weight coefficients of the pieces of information relative to all recommended information sets, and use the sum as a total weight coefficient of the particular piece of information; and determine the recommendation list based on the total weight coefficient of each piece of information.

The determining and recommendation module 204 is configured to: determine accuracy of the recommendation list based on the reference information; determine whether the accuracy is greater than a predetermined threshold; and if the accuracy is greater than the threshold, determine that the recommendation list satisfies the predetermined recommendation condition; or if the accuracy is not greater than the threshold, determine that the recommendation list does not satisfy the predetermined recommendation condition.

The determining and recommendation module 204 is configured to: determine a value of an adjustment to the weight coefficient of each recommended information set based on at least one of the following iteration information: a value of the last adjustment to the weight coefficient of each recommended information set, accuracy of a recommendation list that is determined last time, or a largest accuracy value among accuracy values of all obtained recommendation lists; and adjust the weight coefficient of each recommended information set based on the determined value of the adjustment.

The determining and recommendation module 204 is further configured to determine the most accurate one in all obtained recommendation lists when the number of adjustments to the weight coefficient of each recommended information set reaches a predetermined number of times; and recommend information included in the most accurate recommendation list to the user.

The information recommendation apparatus illustrated in FIG. 2 can be located on servers in various networks. There can be one or more servers. When there is a plurality of servers, the plurality of servers can be connected through a content delivery network. The implementation method is not limited in the present application.

In a typical configuration, a computing device includes one or more processors (CPU), an input/output interface, a network interface, and a memory.

The memory can include a non-persistent memory, a random access memory (RAM), and/or a non-volatile memory in a computer readable medium, such as a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include, but are not limited to, a parameter random access memory (PRAM), a static RAM (SRAM), a dynamic RAM (DRAM), another type of RAM, a ROM, an electrically erasable programmable ROM (EEPROM), a flash memory or another memory technology, a compact disc-ROM (CD-ROM), a digital versatile disc (DVD) or another optical storage, a magnetic cassette tape, a magnetic tape disk storage or another magnetic storage device or any other non-transitory medium, which can be used to store information that can be accessed by the computing device. As defined here, the computer readable medium does not include transitory media such as modulated data signals and carriers.

It is also worthwhile to note that, the terms "include", "comprise", or their any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " further includes, without more constraints, another identical element in the process, method, article, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product implemented on one or more computer usable storage media (including but not limited to a magnetic disk memory, a CD-ROM, an optical memory, etc.) that include computer usable program code.

The earlier descriptions are merely the implementations of the present application, but are not intended to limit the present application. A person skilled in the art can make various modifications and variations to the present application. Any modification, equivalent replacement, or improvement made without departing from the spirit and principle of the present application shall fall within the scope of the claims of the present application.

Figure 3:
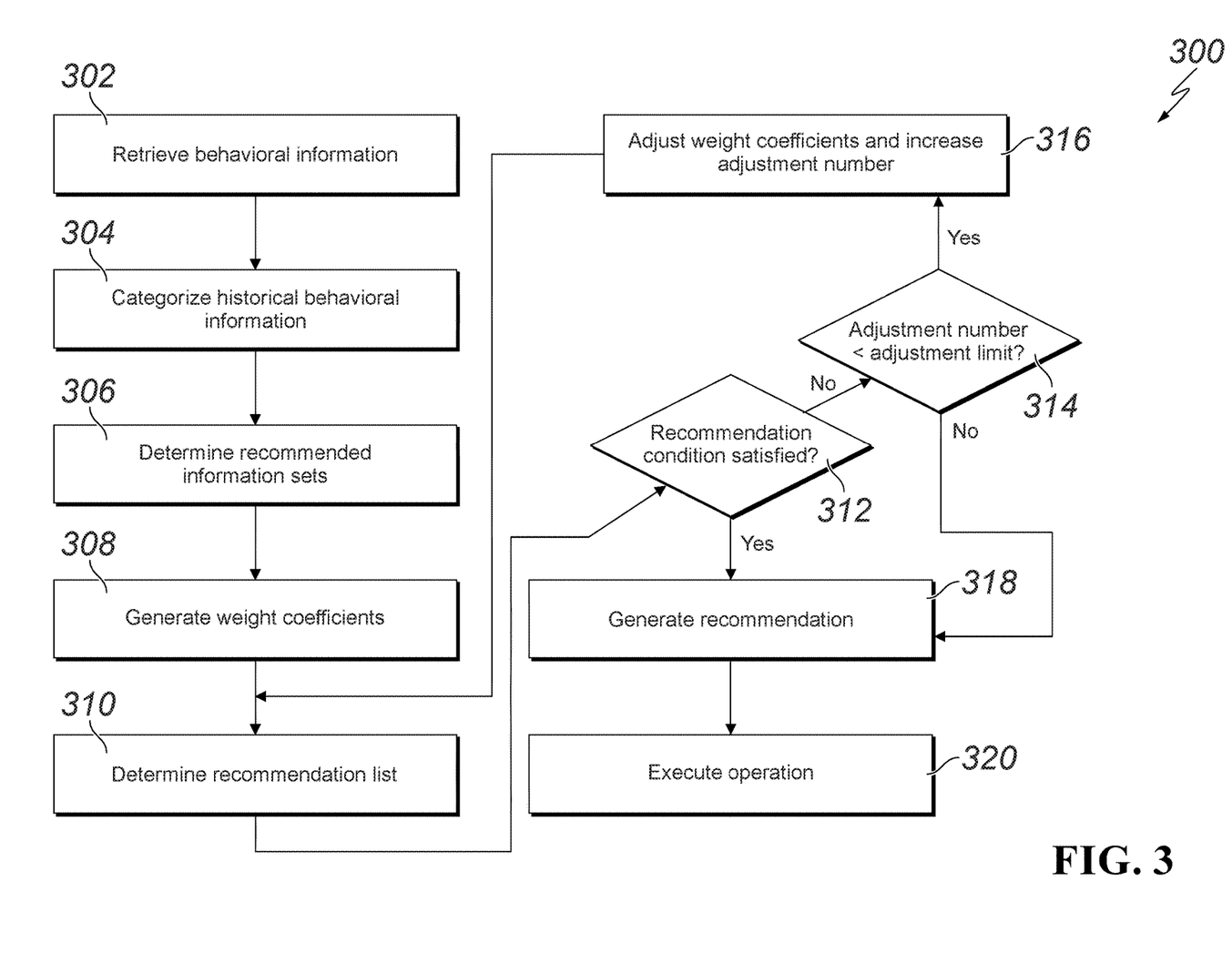
FIG. 3 is a flowchart illustrating an example of a computer-implemented method for generating recommendations, according to an implementation of the present disclosure.

FIG. 3 is a flowchart illustrating an example of a computer-implemented method 300 for generating a recommendation, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, historical behavioral information of a user is retrieved. The historical behavioral information includes data associated to operations performed by the user on a server. The historical behavioral information can include content and attributes of information that the user browsed, searched, followed and/or collected. For example, the historical behavioral information can include a list of items (e.g., merchandise) that were searched for by the user ranked based on a number of times, each item was searched for. The historical behavioral information is associated to the user's preferences, interests, professional or personal needs, and other user behavioral characteristics. In some implementations, the historical behavioral information is retrieved from a particular period of time (for example, most recent 3 months). In some implementations, the historical behavioral information is retrieved based on frequency, such that only repeated data type is included in the historical behavioral information. From 302, method 300 proceeds to 304.

At 304, the historical behavioral information is categorized into test information and reference information based on time periods. The test information can include information from a first time period (e.g., 2018). The reference information can include results of an analyzed information from a second time period (e.g., 2016-2017) that is before the first time period. From 304, method 300 proceeds to 306.

At 306, a plurality of recommended information sets is determined based on the historical behavioral information. In some implementations, the plurality of recommended information sets is determined by applying different recommendation algorithms to the test information. Examples of recommendation algorithms can include a collaborative filtering-based recommendation algorithm, a content-based recommendation algorithm, an association rule-based recommendation algorithm, and a knowledge-based recommendation algorithm. In some implementations, the recommendation algorithms include a user-based collaborative filtering recommendation algorithm and a merchandise-based collaborative filtering recommendation algorithm. Each of the different recommendation algorithms can use the same information as input and can generate different recommended information sets as output. From 306, method 300 proceeds to 308.

At 308, a plurality of weight coefficients is generated for the recommended information sets. The plurality of weight coefficients can form an initial set of weight coefficients determined based on experience (e.g., past analysis of user's behavior) or a random set of weight coefficients obtained based on a random function that generates numerical values within a set interval, such as 0 to 1. The plurality of weight coefficients can represent initial coefficients and can be adjusted through one or more operations. Each weight coefficient of the plurality of weight coefficients is generated for each recommended information set of the plurality of recommended information sets. Each weight coefficient includes a sub-weight coefficient for each piece of information (e.g., item) included in the recommended information set. The sub-weight coefficient is based on a weight coefficient of the respective recommended information set and a recommended weight coefficient of each piece of information for the respective recommended information set. In some implementations, for each piece of information, a sum of sub-weight coefficients of the recommended information sets is determined. The sum can be used as a total weight coefficient of a particular item (piece of information). From 308, method 300 proceeds to 310.

At 310, a recommendation list is determined based on the plurality of weight coefficients. In some implementations, the recommendation list is determined based on the total weight coefficient of each piece of information. From 310, method 300 proceeds to 312.

At 312 it is determined whether the recommendation list satisfies a recommendation condition. In some implementations, the verification of the recommendation condition includes determining an accuracy of the recommendation list based on the reference information and comparing the accuracy to a threshold. The accuracy of the recommendation list can be defined as the ratio between the recommendation list and the historical behavioral information of the user. For example, a number of items that is included in both the recommendation list and the historical behavioral information is compared to the total number of items included in the recommendation list to indicate a consistency between the recommendation list and the historical behavioral information. If it is determined that the accuracy is greater than a threshold it is considered that the recommendation list satisfies the recommendation.

In response to determining that the recommendation list does not satisfy the recommendation condition (e.g., the accuracy is lower than the threshold), from 312, method 300 proceeds to 314. At 314, the number of times the weight coefficients were adjusted is compared to an adjustment limit. In some implementations, the adjustment limit is selected based on computational resources to save network resources, and minimize computational costs of the server. If the adjustment limit is reached, a most accurate recommendation list is determined from the previously determined recommendation lists based on the plurality of accuracy values and from 314 method 300 proceeds to 318.

In response to determining that the number of times the weight coefficients were adjusted is below an adjustment limit, from 314, method 300 proceeds to 316. At 316, the weight coefficient of each recommended information set of the plurality of recommended information sets is adjusted and an adjustment number is increased by a unit. In some implementations, the adjustment of the weight coefficient includes determining a value of an adjustment to the weight coefficient for each recommended information set based on an iteration information using an optimization algorithm. The iteration information can include at least one of a value of a previous adjustment of the weight coefficient of each recommended information set, an accuracy of a recommendation list that was previously determined, and the highest accuracy value of a plurality of accuracy values of previously determined recommendation lists. The optimization algorithm can include a particle swarm algorithm, a genetic algorithm, an ant colony algorithm, an annealing algorithm, or any other type of optimization algorithm that combines analysis of past data with evolution analysis. The weight coefficient of each recommended information set can be adjusted based on the determined value of the adjustment. From 316, method 300 returns to 310.

In response to determining that the recommendation list satisfies the recommendation condition (e.g., the accuracy above the threshold), from 312, method 300 proceeds to 318. At 318, a recommendation based on the recommendation list is transmitted to the user. For example, the recommendation can be automatically displayed within an application associated to the recommendation (e.g., a graphical user interface of a browser). From 318, method 300 proceeds to 320.

At 320, an operation associated to the recommendation (e.g., a purchasing order) is initiated or executed by the server, skipping at least one operation (e.g., search) based on a user input to minimize the time required to complete the operation associated to the recommendation by saving computing resources. After 320, method 300 stops.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   retrieving, by one or more processors, historical behavioral information of a user of a user device, the historical behavioral information comprising data associated to operations performed by the user device on a server;
   determining, by the one or more processors, a plurality of recommended information sets based on a plurality of recommendation algorithms that are different from each other and use as input the historical behavioral information;
   generating, by the one or more processors, a plurality of weight coefficients, each weight coefficient of the plurality of weight coefficients being generated for each recommended information set of the plurality of recommended information sets, wherein the plurality of weight coefficients are automatically adjusted through an iterative process based on user inputs using a particle swarm algorithm to match current interests of the user;
   determining, by the one or more processors, a recommendation list based on the plurality of weight coefficients;
   determining, by the one or more processors, a ratio of (i) a number of items in the recommendation list also included in a reference list extracted from the historical behavioral information of the user, and (ii) a total number of items in the recommendation list, the ratio defining an accuracy of the recommendation list;
   determining, by the one or more processors, that the accuracy of the recommendation list is lower than a threshold comprising a percentage of items included both in the recommendation list and the reference list;
   updating, by the one or more processors, the recommendation list by adjusting each weight coefficient of each recommended information set of the plurality of recommended information sets;
   determining that the accuracy of the recommendation list is greater than the threshold;
   generating, by the one or more processors, based on the recommendation list, a recommendation configured to accelerate access to the items included in the recommendation list; and
   transmitting, by the one or more processors, the recommendation for display on a graphical user interface to be displayed by a device of the user.

2. The computer-implemented method of claim 1, further comprising:
   categorizing the historical behavioral information into test information and reference information.

3. The computer-implemented method of claim 2, wherein the test information comprises: results of a portion of the historical behavioral information analyzed by the plurality of recommendation algorithms.

4. The computer-implemented method of claim 2, further comprising:
   determining a reliability of the accuracy of the recommendation list based on a consistency of the recommendation list with the reference information.

5. The computer-implemented method of claim 2, wherein adjusting each weight coefficient comprises:
   determining a value of an adjustment to each coefficient for each recommended information set based on an iteration information that is related to the reference information; and
   adjusting each weight coefficient of each recommended information set based on the value of the adjustment.

6. The computer-implemented method of claim 5, wherein the iteration information comprises at least one of a value of a previous adjustment of each weight coefficient of each recommended information set, an accuracy of a recommendation list that was previously determined, and highest accuracy value of a plurality of accuracy values of previously determined recommendation lists.

7. The computer-implemented method of claim 6, further comprising:
   in response to determining that a number of adjustments reaches an adjustment threshold, determining a most accurate recommendation list from the previously determined recommendation lists based on the plurality of accuracy values; and
   generating the recommendation based on the most accurate recommendation list.

8. The computer-implemented method of claim 1, wherein each weight coefficient of the plurality of weight coefficients comprises a sub-weight coefficient of each piece of information comprised in the recommended information set based on a weight coefficient of the recommended information set and a recommended weight coefficient of each piece of information relative to the recommended information set.

9. The computer-implemented method of claim 8, further comprising:
   determining, for each piece of information, a sum of sub-weight coefficients of the recommended information sets, and using the sum of sub-weight coefficients as a total weight coefficient of each piece of information; and
   determining the recommendation list based on the total weight coefficient of each piece of information.

10. A non-transitory, computer-readable medium storing one or more instructions executable by a computer system to perform operations comprising:
    retrieving historical behavioral information of a user of a user device, the historical behavioral information comprising data associated to operations performed by the user device on a server;
    determining a plurality of recommended information sets based on a plurality of recommendation algorithms that are different from each other and are using as input the historical behavioral information;
    generating a plurality of weight coefficients, each weight coefficient of the plurality of weight coefficients being generated for each recommended information set of the plurality of recommended information sets, wherein the plurality of weight coefficients are automatically adjusted through an iterative process based on user inputs using a particle swarm algorithm to match current interests of the user;
    determining a recommendation list based on the plurality of weight coefficients;
    determining a ratio of (i) a number of items in the recommendation list also included in a reference list extracted from the historical behavioral information of the user, and (ii) a total number of items in the recommendation list, the ratio defining an accuracy of the recommendation list;
    determining that the accuracy of the recommendation list is lower than a threshold comprising a percentage of items included both in the recommendation list and the reference list;
    updating the recommendation list by adjusting each weight coefficient of each recommended information set of the plurality of recommended information sets;

determining that the accuracy of the recommendation list is greater than the threshold;

generating, based on the recommendation list, a recommendation configured to accelerate access to the items included in the recommendation list; and transmitting the recommendation for display on a graphical user interface to be displayed by a device of the user.

11. The non-transitory, computer-readable medium of claim 10, the operations further comprising:

categorizing the historical behavioral information into test information and reference information.

12. The non-transitory, computer-readable medium of claim 11, wherein the test information comprises: results of a portion of the historical behavioral information analyzed by the plurality of recommendation algorithms.

13. The non-transitory, computer-readable medium of claim 11, the operations further comprising:

determining a reliability of the accuracy of the recommendation list based on a consistency of the recommendation list with the reference information.

14. The non-transitory, computer-readable medium of claim 13, wherein adjusting each weight coefficient of each recommended information set of the plurality of recommended information sets comprises:

determining a value of an adjustment to each coefficient for each recommended information set based on an iteration information that is related to the reference information; and adjusting each weight coefficient of each recommended information set based on the value of the adjustment.

15. A computer-implemented system, comprising:

one or more computers; and one or more computer memory devices interoperably coupled with the one or more computers and having tangible, non-transitory, machine-readable media storing one or more instructions that, when executed by the one or more computers, perform operations comprising:

retrieving historical behavioral information of a user of a user device, the historical behavioral information comprising data associated to operations performed by the user device on a server;

determining a plurality of recommended information sets based on a plurality of recommendation algorithms that are different from each other and are using as input the historical behavioral information;

generating a plurality of weight coefficients, each weight coefficient of the plurality of weight coefficients being generated for each recommended information set of the plurality of recommended information sets, wherein the plurality of weight coefficients are automatically adjusted through an iterative process based on user inputs using a particle swarm algorithm to match current interests of the user;

determining a recommendation list based on the plurality of weight coefficients;

determining a ratio of (i) a number of items in the recommendation list also included in a reference list extracted from the historical behavioral information of the user, and (ii) a total number of items in the recommendation list, the ratio defining an accuracy of the recommendation list;

determining that the accuracy of the recommendation list is lower than a threshold comprising a percentage of items included both in the recommendation list and the reference list;

updating the recommendation list by adjusting each weight coefficient of each recommended information set of the plurality of recommended information sets;

determining that the accuracy of the recommendation list is greater than the threshold;

generating, based on the recommendation list, a recommendation configured to accelerate access to the items included in the recommendation list; and transmitting the recommendation for display on a graphical user interface to be displayed by a device of the user.

16. The computer-implemented system of claim 15, the operations further comprising:

categorizing the historical behavioral information into test information and reference information.

17. The computer-implemented system of claim 16, wherein the test information comprises: results of a portion of the historical behavioral information analyzed by the plurality of recommendation algorithms.

18. The computer-implemented system of claim 16, the operations further comprising:

determining a reliability of the accuracy of the recommendation list based on a consistency of the recommendation list with the reference information.

19. The computer-implemented system of claim 18, wherein adjusting each weight coefficient of each recommended information set of the plurality of recommended information sets comprises:

determining a value of an adjustment to each coefficient for each recommended information set based on an iteration information that is related to the reference information; and adjusting each weight coefficient of each recommended information set based on the value of the adjustment.

* * * * *